United States Patent
Meek et al.

(10) Patent No.: US 10,100,797 B2
(45) Date of Patent: Oct. 16, 2018

(54) FUEL INJECTOR

(71) Applicants: WESTPORT POWER INC., Vancouver (CA); DELPHI INTERNATIONAL OPERATIONS LUXEMBOURG S.À.R.L., Bascharage (LU)

(72) Inventors: George A. Meek, Lydney (GB); Lukhbir Panesar, Feltham (GB)

(73) Assignees: WESTPORT POWER INC., Vancouver (CA); DELPHI INTERNATIONAL OPERATIONS LUXEMBOURG S.A.R.L., Bascharage (LU)

(*) Notice: Subject to any disclaimer, the term of this patent is extended or adjusted under 35 U.S.C. 154(b) by 63 days.

(21) Appl. No.: 14/892,992

(22) PCT Filed: May 21, 2014

(86) PCT No.: PCT/CA2014/050469
§ 371 (c)(1),
(2) Date: Nov. 20, 2015

(87) PCT Pub. No.: WO2014/186892
PCT Pub. Date: Nov. 27, 2014

(65) Prior Publication Data
US 2016/0169177 A1 Jun. 16, 2016

(30) Foreign Application Priority Data
May 21, 2013 (GB) .................................. 1309122.8

(51) Int. Cl.
*F02M 61/12* (2006.01)
*F02M 43/04* (2006.01)
(Continued)

(52) U.S. Cl.
CPC ............ *F02M 61/12* (2013.01); *F02M 43/04* (2013.01); *F02M 47/025* (2013.01);
(Continued)

(58) Field of Classification Search
CPC .. F02M 61/12; F02M 51/0653; F02M 63/001; F02M 47/025; F02M 51/0675;
(Continued)

(56) References Cited

U.S. PATENT DOCUMENTS 4,465,237 A    8/1984  Küpper
5,979,803 A   11/1999  Peters et al.
(Continued)

FOREIGN PATENT DOCUMENTS

CN         101657630 A      2/2012
DE   10 2006 000 148 A1    10/2006
(Continued)

OTHER PUBLICATIONS

Extended Search Report from European Patent Office dated Oct. 10, 2016, issued in corresponding European Application No. 14801244.6 (7 pages).
(Continued)

*Primary Examiner* — Hung Q Nguyen
*Assistant Examiner* — Xiao Mo
(74) *Attorney, Agent, or Firm* — Seed IP Law Group LLP

(57) ABSTRACT

A fuel injector (100) for an internal combustion engine is disclosed. The fuel injector is particularly suitable for use as a dual fuel injector, and comprises a generally tubular outer valve needle (130), an inner valve needle (140) slidably received in the outer valve needle (130), and a nozzle body assembly (112) comprising a tip part (120) and a needle guide part (118). The tip part (120) defines a seating region (120*f*) for the outer valve needle (130), and the needle guide part (118) comprises a guide bore (118*e*) for slidably receiv-
(Continued)

ing the outer valve needle (130). In one embodiment, the tip part (120) and the needle guide part (118) are made from different materials, and a biasing spring (148) for the outer valve needle (130) is housed in the nozzle body assembly (112).

21 Claims, 3 Drawing Sheets

(51) Int. Cl.
*F02M 47/02* (2006.01)
*F02M 51/06* (2006.01)
*F02M 63/00* (2006.01)
*F02D 41/00* (2006.01)
*F02D 19/06* (2006.01)

(52) U.S. Cl.
CPC .... *F02M 51/0653* (2013.01); *F02M 51/0675* (2013.01); *F02M 63/001* (2013.01); *F02D 19/0694* (2013.01); *F02D 41/0025* (2013.01); *F02D 41/0027* (2013.01); *F02M 2200/16* (2013.01); *F02M 2200/46* (2013.01); *F02M 2200/50* (2013.01); *F02M 2200/90* (2013.01); *F02M 2547/006* (2013.01); *Y02T 10/36* (2013.01)

(58) Field of Classification Search
CPC .............. F02M 43/04; F02M 2200/50; F02M 2547/006; F02M 2200/16; F02M 2200/46; F02M 2200/90; Y02T 10/36; F02D 19/0694; F02D 41/0027; F02D 41/0025
See application file for complete search history.

(56) References Cited

U.S. PATENT DOCUMENTS

| | | |
|---|---|---|
| 2003/0038185 A1 | 2/2003 | Carrol, III et al. |
| 2003/0066509 A1* | 4/2003 | Shafer ................. F02D 41/3064 123/305 |
| 2004/0021013 A1* | 2/2004 | Lawrence ............. F02M 57/025 239/533.12 |
| 2004/0055562 A1* | 3/2004 | Stewart ................. F02M 45/02 123/299 |
| 2004/0108394 A1* | 6/2004 | Lawrence ............. F02M 45/086 239/533.2 |
| 2004/0195385 A1* | 10/2004 | Lawrence ............. F02M 45/086 239/533.2 |
| 2005/0194468 A1 | 9/2005 | Brenk et al. |
| 2007/0199539 A1* | 8/2007 | Lennox ................ F02D 19/0628 123/304 |
| 2010/0133361 A1* | 6/2010 | Futonagane ......... F02M 45/086 239/533.12 |
| 2013/0048750 A1 | 2/2013 | Kim et al. |
| 2013/0160741 A1* | 6/2013 | Sommars ............... F02M 43/04 123/456 |
| 2014/0069387 A1* | 3/2014 | Brown ................. F02M 45/086 123/456 |

FOREIGN PATENT DOCUMENTS

| | | |
|---|---|---|
| DE | 102007028091 A1 | 12/2008 |
| EP | 1630406 A1 | 3/2006 |
| EP | 2 060 774 A1 | 5/2009 |
| EP | 2 487 353 A2 | 8/2012 |
| EP | 1 939 950 B1 | 2/2013 |
| GB | 2 003 550 A | 3/1979 |
| JP | 60-256555 A | 12/1985 |
| JP | 2-87959 U | 7/1990 |
| JP | 11-159420 A | 6/1999 |
| JP | 2006-307832 A | 11/2006 |
| JP | 2007-500816 A | 1/2007 |
| JP | 2009-57884 A | 3/2009 |
| JP | 2009121402 A | 6/2009 |
| JP | 2011-149417 A | 8/2011 |
| WO | 00/15956 A1 | 3/2000 |
| WO | 2005106238 A1 | 11/2005 |
| WO | 2008/125934 A1 | 10/2008 |
| WO | 2012/171119 A1 | 12/2012 |
| WO | 2012/177487 A2 | 12/2012 |

OTHER PUBLICATIONS

GB Office Action, dated Nov. 21, 2013, for British Application No. GB1309122.8, 8 pages.
English Translation of previously cited Chinese Office Action, dated Sep. 20, 2017, for Chinese Application No. 201480028952.2, 7 pages.
Chinese Office Action, dated Sep. 20, 2017, for Chinese Application No. 201480028952.2, 4 pages.
Chinese Search Report, dated Sep. 20, 2017, for Chinese Application No. 201480028952.2, 5 pages (with English translation).
Japanese Office Action, dated Mar. 20, 2018, for Japanese Application No. 2016-514227, 17 pages. (with English Translation).
Chinese Search Report, dated May 31, 2018, for Chinese Application No. 2014800289522, 2 pages.

* cited by examiner

FUEL INJECTOR

FIELD OF THE INVENTION

The present invention relates to a fuel injector suitable for controlling the delivery of two different fuels into an internal combustion engine. In particular, but not exclusively, the invention relates to a fuel injector suitable for injecting a gaseous fuel and a liquid fuel.

BACKGROUND TO THE INVENTION

Internal combustion engines for heavy-duty and industrial applications are typically fuelled by diesel. However, the use of natural gas as an alternative to diesel is of increasing interest. Natural gas is relatively abundant and relatively cheap, and can, in principle, provide similar levels of power to diesel whilst producing lower particulate and nitrogen oxide (NOx) emissions.

Natural gas can be used in place of diesel to fuel a compression-ignition engine, in which combustion of the fuel occurs as a result of compression of the air-fuel mixture in the cylinder. However, because natural gas has a higher auto-ignition temperature than diesel, it can be necessary to initiate combustion with a pilot injection of diesel fuel before introducing the natural gas to the combustion chamber.

In one type of natural gas-powered engine, known as a high-pressure direct injection (HPDI) engine, both natural gas and diesel are injected directly into the combustion chamber. Due to the space constraints in an engine cylinder head, it is desirable to inject both fuels using one fuel injector per cylinder. This requires a fuel injector that is specially adapted to keep the two fuels separate within the injector, and to deliver independently the respective fuel at the appropriate time.

One such 'dual fuel' injector is described in International Patent Application Publication No. WO 00/15956. In this example, a fuel injector with a concentric twin nozzle arrangement is provided. Inner and outer valve needles are engageable at their lower ends with respective valve seats to control the flow of fuel through respective inner and outer sets of outlets. The outer valve needle controls the injection of natural gas through the outer set of outlets, and the inner valve needle controls the injection of diesel through the inner set of outlets. The outer valve needle is tubular to accommodate the inner valve needle, and the inner set of outlets is formed at a tip of the outer valve needle.

The inner and outer valve needles are controlled independently by two electromagnetic control valves, which are configured to control the pressure of a control fluid (normally diesel fuel) within respective control chambers for the inner and outer valve needles. The control chambers receive the upper ends of the respective needles, so that changing the pressure of the control fluid in each control chamber changes the downward (closing) force on the corresponding needle. Gas or diesel fuel pressure acts on downwardly-facing thrust surfaces of the respective needles to generate an upward (opening) force on the needle. When the pressure of the control fluid in a control chamber is relatively high, the downward force is greater than the upward force and the respective needle remains seated, and when the pressure of the control fluid is relatively low, the upward force overcomes the downward force and the respective needle opens to permit fuel injection through the respective set of outlets.

Each control chamber is connected to a source of control fluid at relatively high pressure. Each control valve is operable to connect the respective control chamber to a low-pressure drain for the control fluid. In this way, opening of each control valve causes a reduction in the pressure of the control fluid in the corresponding control chamber, resulting in opening of the corresponding valve needle.

The valve needles are typically housed in a nozzle body of the injector, with the fuel outlets disposed at a tip of the nozzle body. The nozzle body is attached to a nozzle holder or injector body by a cap nut. In use, the injector is mounted in a bore in the cylinder head of the engine. The injector extends through the bore, so that the tip of the nozzle body protrudes into the respective combustion chamber. The maximum diameter of the cylinder head bore, and hence the maximum diameters of the cap nut, the nozzle body and the injector body of the injector, are constrained by the limited space available in the cylinder head.

The restricted maximum diameter of the nozzle body can be particularly limiting in the design of dual fuel injectors. The nozzle body must accommodate supply passages to deliver the two fuels to the tip region for injection, and may also accommodate service passages to connect with one or both of the control chambers. Accordingly, it would be desirable to maximise the amount of space available within the nozzle body.

The nozzle body typically defines both the seating region and a needle guide region for the outer valve needle. To mitigate wear or other damage to the seating region due to the closing impact of the outer valve needle, the nozzle body is usually made from a high-strength steel, such as a tool steel. Tool steel is relatively expensive and difficult to machine, which makes the component cost of the nozzle body relatively high. It would therefore also be desirable to reduce the cost of the nozzle body.

SUMMARY OF THE INVENTION

Against that background, from a first aspect, the present invention resides in a fuel injector for an internal combustion engine, comprising a generally tubular outer valve needle, an inner valve needle slidably received in the outer valve needle, and a nozzle body assembly comprising a tip part and a needle guide part. The tip part defines a seating region for the outer valve needle, and the needle guide part comprises a guide bore for slidably receiving the outer valve needle.

Advantageously, because the nozzle body assembly is formed from two parts, the different materials can be selected to improve manufacturability, reduce cost and optimise performance. Preferably, therefore, the tip part and the needle guide part are made from different materials. For example, the tip part may be made from a high-grade steel with good wear resistance and very good machinability. The needle guide part may be made from a lower-grade steel. Alternatively, or in addition, the tip part and the needle guide part may be made from materials that have been subjected to different heat treatments.

The design of the nozzle tip of an injector is typically tailored to suit a particular application. In particular, the number, position, angle and shape of the fuel outlet orifices in the nozzle tip can be selected to optimise performance of the injector for a particular combustion chamber design. In the present invention, only the tip part of the nozzle body assembly needs be designed to suit a particular application. The needle guide part of the nozzle body assembly, and the remaining components of the injector, can be of a common design across multiple applications. Therefore the present invention provides an injector design that can be readily tailored for different applications at minimum cost.

The needle guide part may have a larger outer diameter than the tip part. The needle guide part may comprise a recess for receiving an end region of the tip part. The recess may be formed in an end face of the needle guide part.

The injector may comprise a cap nut arranged to clamp the tip part to the needle guide part. In one embodiment, the tip part comprises a shoulder, and the cap nut is arranged to engage with the shoulder to clamp the tip part to the needle guide part. Preferably, the shoulder is disposed at an end of the tip part, opposite the seating region. In this way, the needle guide part need not include a shoulder for engagement with the cap nut, so that the diameter of the cap nut can be maximised along the length of the cap nut, creating more space within the cap nut for fuel passages and the like.

The inner and outer valve needles may be arranged along a common injector axis. The needle guide part may comprise one or more fuel supply passages that extend parallel to the injector axis.

The injector may include biasing means to bias the outer valve needle into engagement with the seating region defined by the tip part. Preferably, the biasing means is housed, at least in part, in the nozzle body assembly. For example, the needle guide part may comprise a spring chamber for receiving the biasing means. Alternatively, or in addition, the biasing means may be housed, at least in part, in the tip part. The two-part construction of the nozzle body assembly enables the biasing means for the outer valve needle to be inserted in the nozzle body assembly during assembly of the injector.

In one embodiment, the biasing means comprises a spring disposed around the outer valve needle. The outer valve needle may include a spring seat for the spring, for example in the form of a collar that is press-fitted to the outer valve needle.

The injector may further comprise sealing means to guard against leakage of fuel between the outer valve needle and the guide bore. For example, the sealing means may comprise an annular seal disposed around the outer valve needle. The sealing means is preferably disposed at or adjacent to an end of the guide bore.

When the fuel injector also includes biasing means for the outer valve needle, the biasing may be arranged to retain the sealing means. For example, the biasing means may bias the sealing means against a surface of the needle guide part.

The fuel injector is preferably a dual fuel injector. Accordingly, the outer valve needle may be arranged to control the injection of a first fuel from the fuel injector, and the inner valve needle may be arranged to control the injection of a second fuel from the fuel injector. Preferably, the first fuel is a gaseous fuel, such as natural gas, and the second fuel is a liquid fuel, such as diesel.

The injector may comprise a first control chamber associated with the outer valve needle, and a second control chamber associated with the inner valve needle. Movement of the outer and inner valve needles may be controllable by varying the fuel pressure in the first and second control chambers respectively.

BRIEF DESCRIPTION OF THE DRAWINGS

The present invention will now be described, by way of example only, with reference to the accompanying drawings, in which like reference numerals are used for like features, and in which.

DETAILED DESCRIPTION OF EMBODIMENTS OF THE INVENTION

Figure 1:
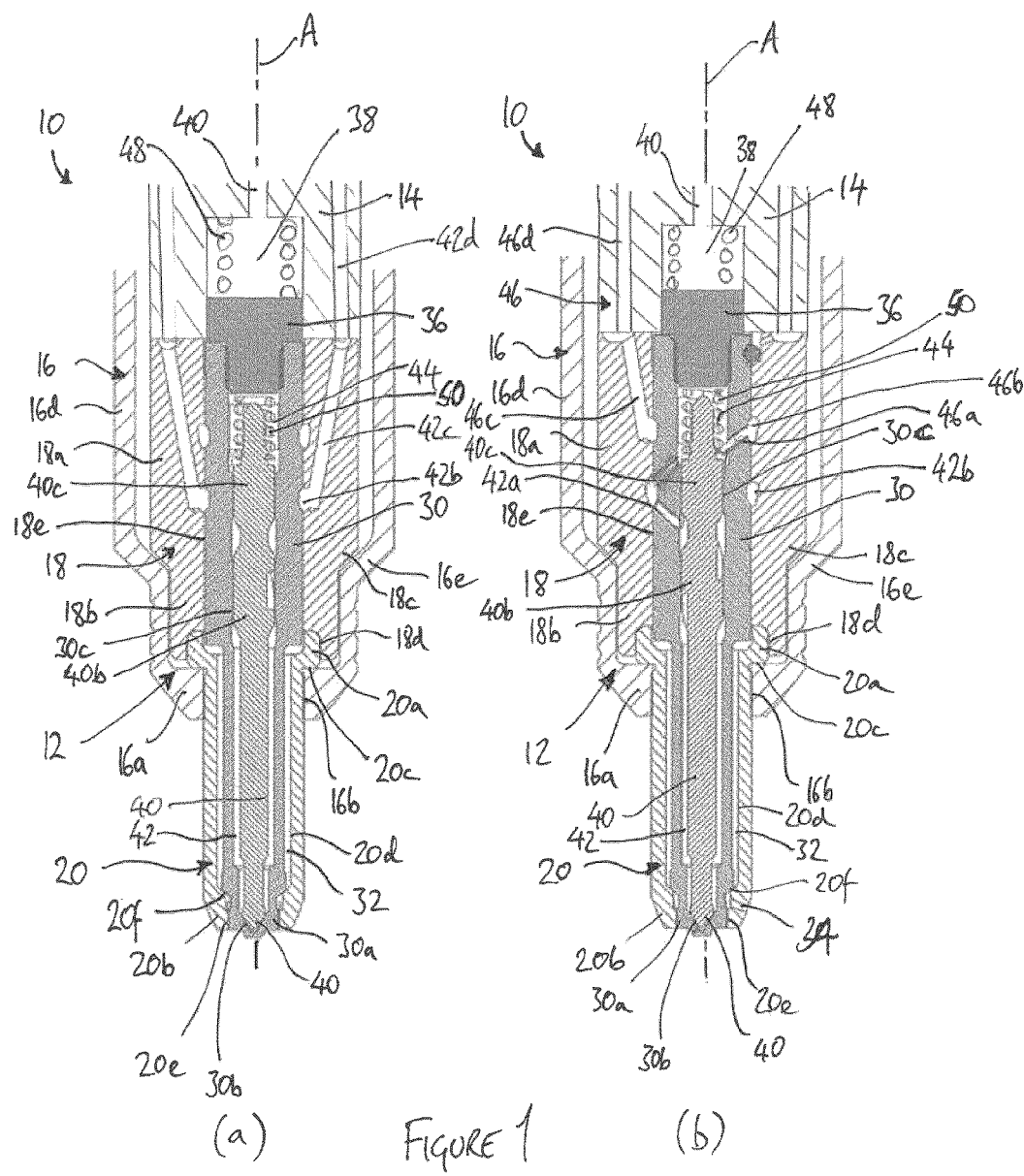
FIGS. 1(a) and 1(b) are sectional views of part of a fuel injector according to one embodiment of the present invention.

FIGS. 1(a) and 1(b) show a nozzle region of a fuel injector 10 according to a first embodiment of the present invention. The injector 10 is elongate to define an injector axis A. FIG. 1(a) is a sectional view taken on a first plane that contains the injector axis A, and FIG. 1(b) is a sectional view taken on a second plane that also contains the injector axis A and is perpendicular to the first plane.

The injector 10 comprises a nozzle body assembly 12, an injector body 14, and a cap nut 16. Only the lower ends of the injector body 14 and the cap nut 16 are illustrated in FIGS. 1(a) and 1(b).

The nozzle body assembly 12 comprises a needle guide part 18 and a tip part 20. The needle guide part 18 comprises an upper, relatively large diameter cylindrical region 18a and a lower, smaller-diameter cylindrical region 18b. The upper and lower regions 18a, 18b are separated by a frustoconical region 18c. The tip part 20 is generally tubular, and comprises an upper end region 20a and a tip region 20b opposite the upper end region 20a. The upper end region 20a has an increased diameter compared to the remainder of the tip part 20, so as to define a shoulder 20c at the upper end of the tip part 20. The lower end face of the lower region 18a of the needle guide part 18 includes a recess 18d that receives, in part, the upper end region 20a of the tip part 20.

The cap nut 16 is generally tubular, and comprises an inwardly-directed flange 16a at its lowermost end. The flange 16a engages with the shoulder 20c of the tip part 20, and the remainder of the tip part 20 protrudes through the circular opening 16b in the cap nut defined by the flange 16a. A relatively small-diameter, tubular first region 16c of the cap nut is disposed adjacent to the flange 16a. The upper region 20a of the tip part 20 and the lower region 18b of the needle guide part 18 are received within the first region 16c of the cap nut 16c.

A relatively large-diameter, tubular second region 16d of the cap nut 16 is connected to the first region 16c by an intermediate frustoconical region 16e. The upper region 18a of the needle guide part 18 is disposed in the second region 16d of the cap nut 16, and the frustoconical region 18c of the needle guide part is disposed in the frustoconical region 16e of the cap nut 16. There is a clearance between the cap nut 16 and all of the parts of the needle guide part 18.

The upper end of the second region 16d of the cap nut 16 includes an internally threaded region (not shown), which engages with an externally-threaded region of an injector cap part (not shown), which is located at the top end of the injector body 14, remote from the nozzle body assembly 12. In this way, the cap nut serves to clamp together the tip part 20 and the needle guide part 18 of the nozzle body assembly 12, and to hold the nozzle body assembly 12 in engagement with the injector body 14. The clamping force applied by the cap nut 16 is sufficient to create a fluid-tight seal between the injector body 14 and the needle guide part 18 and between the needle guide part 18 and the tip part 20.

The nozzle body assembly 12 houses two concentrically arranged valve needles for controlling the delivery of two different fuels from the injector. A first or outer valve needle 30 is slidably received within a guide bore 18e that extends axially through the needle guide part 18 of the nozzle body assembly 12. The outer valve needle 30 extends into the bore 20d of the tubular tip part 20 of the nozzle body assembly 12. The outer valve needle 30 is a clearance fit within the bore 20d, so as to define a first annular accumulator volume 32 for a first fuel between the outer valve needle 30 and the bore 20d. The accumulator volume 32 is fed with the first fuel by way of suitable passages (not shown) formed in the needle guide part 18.

A tip region 30a of the outer valve needle 30 is slidably received in an aperture 20e in the end of the tip region 20b of the tip part 20 of the nozzle body assembly 12. A frustoconical valve seat 30b is provided on the outer valve needle 30 upstream of its tip region 30a. The valve seat 30b is engageable with a frustoconical seating region 20f formed at the tip region 20b of the tip part 20 to control the delivery of the first fuel from the first accumulator volume 32 through a plurality of outlets 34 (one of which is shown in FIG. 1(*b*)), disposed in the tip part 20 downstream of the seating region 20f.

An upper end of the outer valve needle 30, opposite the tip region 30a, is closed by a cap 36. The cap 36 is slidably received in a bore 14a formed in the injector body 14. The bore 14a and the end face of the cap 36 together define a first control chamber 38 for the outer valve needle. The first control chamber 38 is connected, by way of a service passage 40, to a first control valve (not shown) which is operable to vary the pressure of a control fluid in the first control chamber 38 in a manner known in the art. When the pressure of control fluid in the first control chamber 38 is relatively high, the outer valve needle 30 is urged into engagement with the seating region 20f. When the first control valve is operated to reduce the pressure of control fluid in the first control chamber 38 to a relatively low level, the outer valve needle 30 is caused to lift away from the seating region 20f, thereby allowing the injection of the first fuel from the outlets 34.

A second, inner valve needle 40 is slidably received within the bore 30c of the outer valve needle 30. A tip 40a of the inner valve needle 40 is engageable with a seating region 30b formed at the tip region 30a of the outer valve needle 30 to control the release of a second fuel from a second annular accumulator volume 42, disposed between the inner valve needle 40 and the bore 30c of the outer valve needle 30, through a plurality of outlets formed in the tip region 30a of the outer valve needle 30, downstream of the seating region 30b.

The second accumulator volume 42 is supplied with the second fuel by way of a drilling 42a through the wall of the outer valve needle 30 that connects the second accumulator volume 42 to an annular gallery 42b formed between the outer valve needle 30 and the wall of the guide bore 18e. As shown in FIG. 1(*a*), a further passage 42c extends through the needle guide part 18 to connect the gallery 42b to a second fuel supply passage 42d in the injector body 14.

The inner valve needle 40 includes a guide region 40b which is in sliding contact with the wall of the outer valve needle bore 30c. The guide region 40b includes grooves, flutes or other formations to allow the second fuel to flow freely past the guide region 40b. Upstream of the guide region 40b, the inner valve needle 40 is formed into a piston region 40c, which is also in sliding contact with the wall of the outer valve needle bore 30c. The second fuel cannot flow freely past the piston region 40c, so that the piston region 40c separates the second accumulator volume 42 from a second control chamber 44 for the inner valve needle 40. The second control chamber 44 is disposed at the upper end of the outer valve needle bore 30c, and is defined by the cap 36, the wall of the outer valve needle bore 30c, and an upper end of the inner valve needle 30.

The second control chamber 44 is connected, by way of a second service flow path 46, to a second control valve (not shown) which is operable to vary the pressure of a control fluid in the second control chamber 44 in a manner known in the art. As shown most clearly in FIG. 1(*b*), the second service flow path 46 includes a passage 46a that extends through the wall of the outer valve needle 30 to connect the second control chamber 44 to an annular gallery 46b formed between the outer valve needle 30 and the guide bore 18e. The second service flow path 46 also includes a passage 46c that extends through the guide part 18 to connect the gallery 46b to a further passage 46d in the injector body 14.

When the pressure of control fluid in the second control chamber 44 is relatively high, the inner valve needle 40 is urged into engagement with the seating region 30b. When the second control valve is operated to reduce the pressure of control fluid in the second control chamber 44 to a relatively low level, the inner valve needle 40 is caused to lift away from the seating region 30b, thereby allowing the injection of the second fuel from the outlets in the tip region 30a of the outer valve needle 30.

A first biasing spring 48 for the outer valve needle 30 is housed in the first control chamber 38. A second biasing spring 50 for the inner valve needle 40 is housed in the second control chamber 44. The biasing springs 48, 50 serve to provide an additional closing force to the respective outer and inner valve needles 30, 40 that helps to keep the needles 30, 40 seated when the injector is not in use.

In one embodiment of the invention, the first fuel is a gaseous fuel, such as natural gas, and the second fuel is a liquid fuel, such as diesel. Diesel fuel can also be used as the control fluid in the first and second control chambers 38, 44. Advantageously, when the second fuel and/or the control fluid is diesel, the sliding interfaces between the valve needles 30, 40 and the nozzle holder assembly 12 are self-lubricated by the diesel fuel.

Because the nozzle holder assembly 12 is made from two parts, rather than a single part as known in the prior art, in the present invention the needle guide part 18 and the tip part 20 of the nozzle holder assembly 12 can be made from different materials. In a particularly advantageous arrangement, the tip part 20 is made from a steel with good wear resistance, such as a tool steel, whereas the needle guide part 18 is at lower risk of wear or other damage and so can be made from a cheaper material, such as a mild steel.

A further advantage of using the two-part nozzle holder assembly 12 of the present invention is that the needle guide part 18 and the tip part 20 can be manufactured separately, for example by machining each part from tube stock of a starting size selected according to the required maximum diameter of each part. In this way, material wastage can be minimised.

It will also be appreciated that, because the cap nut 16 engages with the shoulder 20c of the tip part 20 of the nozzle assembly 12, and not with the needle guide part 18, the diameter of the needle guide part 18 can be maximised within the envelope of the cap nut 16. In particular, it is not necessary to reduce the diameter of the needle guide part 18 to form a step or shoulder with which the cap nut 16 can engage.

Part of a fuel injector 100 according to a second embodiment of the invention is shown in FIGS. 2(a) and 2(b), which are sectional views taken in perpendicular planes that intersect along the injector axis A. The second embodiment of the invention is generally similar to the first embodiment of the invention described above, and only the differences between the embodiments will be described in detail. In FIGS. 2(a) and 2(b), the cap nut and the injector body are omitted for clarity.

As in the first embodiment of the invention, in this second embodiment the tip part 120 of the nozzle body assembly 112 is clamped against the needle guide part 118 of the nozzle body assembly 112 by the cap nut (not shown), which engages with a shoulder 120c of the tip part 120. The needle guide part 118 includes a recess 118d for receiving the upper end of the tip part 120.

In this second embodiment, the first biasing spring 148 for the outer valve needle 130 is housed within the nozzle body assembly 112, instead of in the injector body. To accommodate the first biasing spring 148, the needle guide part 118 of the nozzle body assembly 112 includes a spring cavity 152 that is defined by an enlarged diameter lower bore region 118f that connects at its uppermost end with the guide bore 118e and at its lowermost end with the recess 118d.

A lower end of the first biasing spring 148 seats upon a collar 154 that is press-fitted or otherwise attached to the outer surface of the outer valve needle 130. In this way, the first biasing spring 148 acts through the collar 154 to bias the outer valve needle 130 into engagement with the seating region 120f of the tip part 120. An upper end of the first biasing spring 148 serves to retain a sealing assembly 160 in position against a surface defined by the uppermost end 152a of the spring cavity 152.

The sealing assembly 160 comprises an annular sealing member in the form of an O-ring 162a and a dynamic shaft seal 162b disposed between the O-ring 162a and the outer valve needle 130. The O-ring 162a forms a static fluid-tight seal between the uppermost end 152a of the spring cavity 152 and the dynamic shaft seal 162b. The first biasing spring 148 bears upon a steel washer 164, which in turn presses the O-ring 162a against the uppermost end 152a of the spring cavity 152. The compression of the O-ring 162a causes a radial sealing force to be applied to the dynamic shaft seal 162b to maintain a sealing force against wall of the outer valve needle 130.

Figure 2:
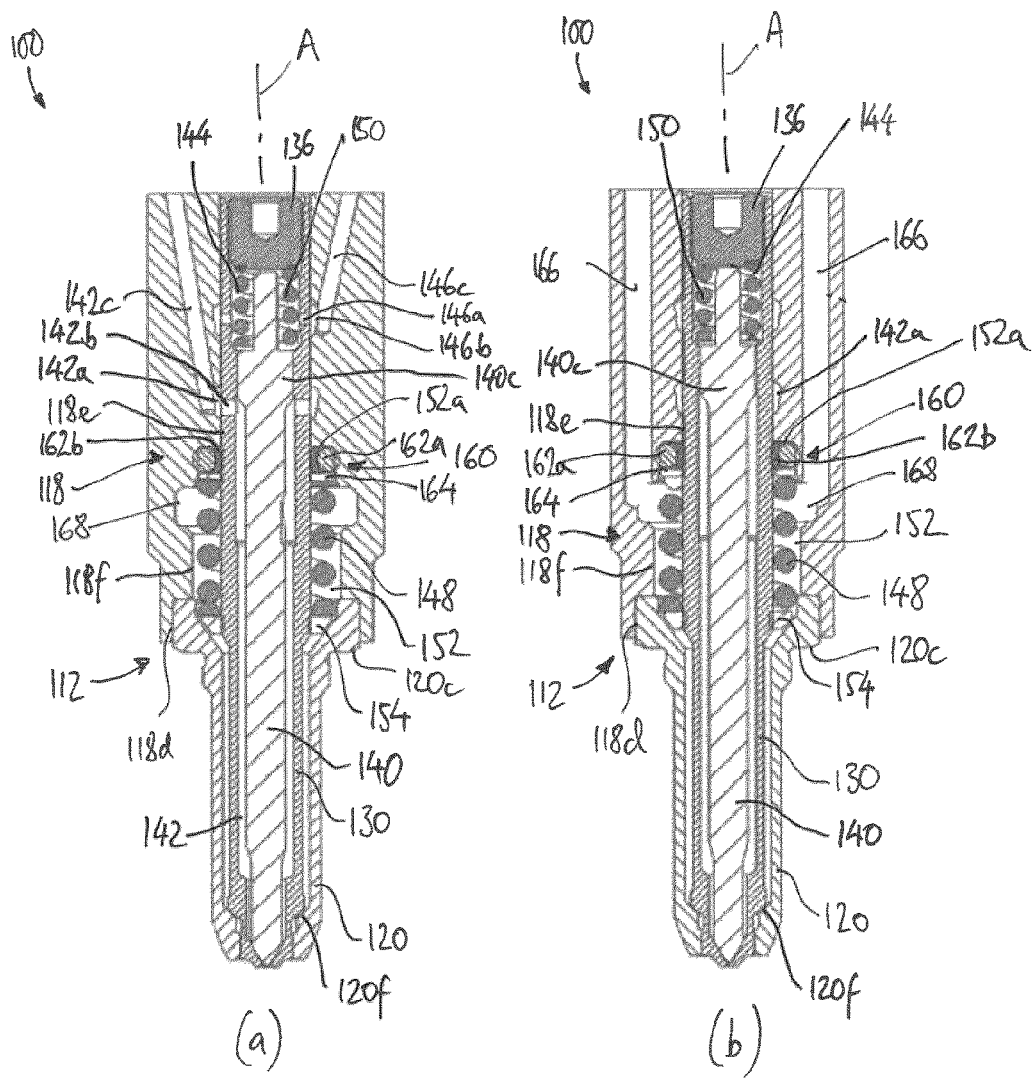
FIGS. 2(a) and 2(b) are sectional views of part of a fuel injector according to another embodiment of the present invention.

A cap 136 of the outer valve needle 130 is exposed to fuel pressure in the first control chamber (not shown in FIG. 2). Advantageously, by housing the first biasing spring 148 in the nozzle body assembly 112 instead of in the first control chamber, the volume of the first control chamber can be minimised, which helps to optimise control of the movement of the outer valve needle 130.

As shown in FIG. 2(b), two supply passages 166 for the first fuel extend from the top face of the needle guide part 118 to communicate with an annular gallery 168 that, in turn, communicates with the spring cavity 152. The collar 154 is dimensioned to allow free flow of the first fuel from the spring cavity 152 into the annular accumulator volume 132 defined between the outer valve needle 130 and the bore 120d of the tip part 120.

Referring back to FIG. 2(a), a supply passage 142c for the second fuel is formed in the needle guide part 118 to connect with an annular gallery 142b formed in the needle guide bore 118e. Radial drillings 142a in the outer valve needle 130 connect the annular gallery 142b to the accumulator volume 142 for the second fuel. The annular accumulator volume 142 for the second fuel is disposed between the inner valve needle 140 and the outer valve needle 130. A piston region 140c of the inner valve needle 140 separates the accumulator volume 142 for the second fuel from the second control chamber 144.

A service passage 146c is also formed in the needle guide part 118, to connect the second control valve (not shown) with a further annular gallery 146b formed in the needle guide bore 118e. Further radial drillings 146a in the outer valve needle 140 connect this annular gallery 146b to the second control chamber 144, in which the second biasing spring 150 is housed.

Figure 3:
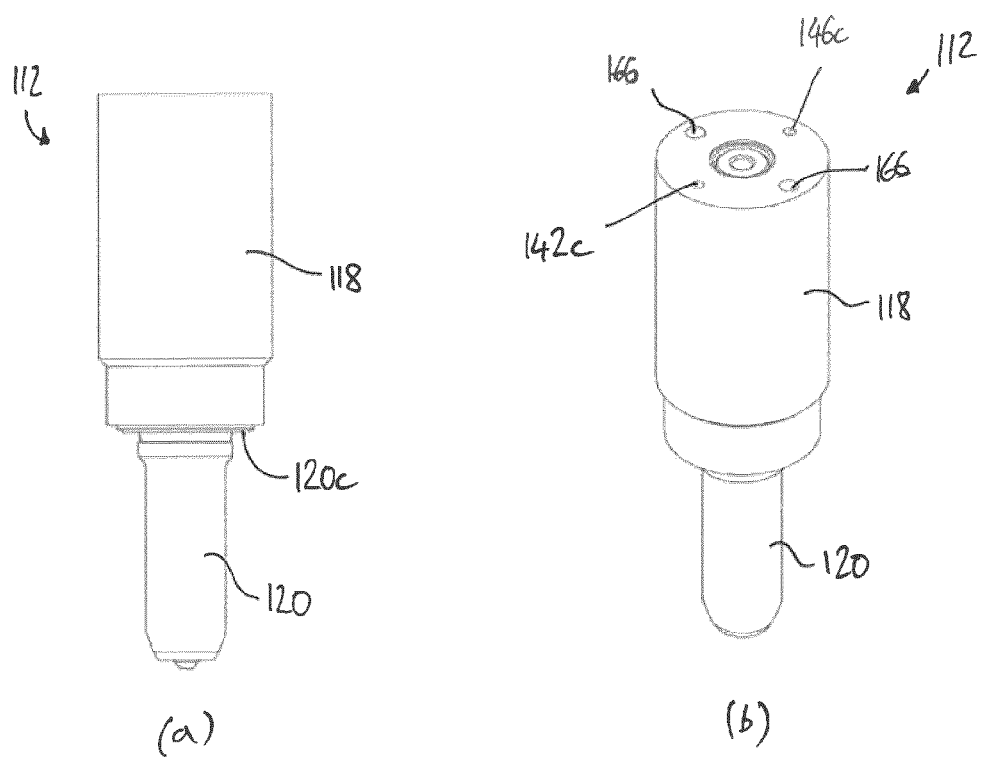
FIG. 3(a) is a side view of a nozzle body of the fuel injector of FIGS. 2(a) and 2(b)
FIG. 3(b) is a perspective view of the nozzle body of the fuel injector of FIGS. 2(a) and 2(b).

FIG. 3(a) shows a side view of the nozzle holder assembly 112. FIG. 3(b) shows a perspective view of the nozzle holder assembly 112, in which the service passage 146c, second fuel supply passage 142c and first fuel supply passages 166 are visible where they emerge from the top face of the needle guide part 118 of the nozzle holder assembly 112.

Referring back to FIGS. 2(a) and 2(b), the sealing assembly 160 serves to guard against mixing of the first and second fuels, by reducing or preventing the flow of fuel from the spring chamber 152 into the guide bore 118e past the sealing member 162, or vice versa. This arrangement means that the pressure of the liquid second fuel can exceed the pressure of the gaseous first fuel by a considerable amount without the risk of mixing of the fuels, therefore improving the atomisation of the second fuel upon injection.

Advantageously, because it is not necessary to form a step in the diameter of the needle guide part 118 of the nozzle body assembly 112 to engage with the cap nut, the supply passages 166 for the first fuel can be oriented parallel to the injector axis A, which makes the formation of the supply passages 166 during manufacture substantially easier.

It will be appreciated that, in this second embodiment of the invention, the use of a two-part nozzle body assembly 112 allows the sealing assembly 160 and the first biasing spring 148 to be inserted in the spring cavity 152 during assembly of the injector 100. If the nozzle body assembly 112 were a single-piece component, it would not be possible to house the first biasing spring 148 in the nozzle body assembly 112, and nor would it be possible to provide a sealing assembly 160.

Further modifications and variations not explicitly described above could also be contemplated by a person skilled in the art without departing from the scope of the invention as defined in the appended claims.

The invention claimed is:

1. A fuel injector for an internal combustion engine, comprising:
  a generally tubular outer valve needle;
  an inner valve needle slidably received in the outer valve needle; and
  a nozzle body assembly comprising a tip part and a needle guide part;
  wherein the tip part defines a seating region for the outer valve needle; and
  wherein the needle guide part comprises a guide bore for slidably receiving the outer valve needle and a lower bore region adjacent the tip part, said lower bore region of the needle guide part having a larger bore diameter than said guide bore and defining a cavity formed around the outer valve needle for receiving a biasing means.

2. The fuel injector according to claim 1 wherein the tip part and the needle guide part are made from different materials.

3. The fuel injector according to claim 1, wherein the needle guide part comprises a recess for receiving an end region of the tip part.

4. The fuel injector according to claim 1, further comprising a cap nut arranged to clamp the tip part to the needle guide part.

5. The fuel injector according to claim 4, wherein the tip part comprises a shoulder, and wherein the cap nut is arranged to engage with the shoulder to clamp the tip part to the needle guide part.

6. The fuel injector according to claim 5 wherein the shoulder is disposed at or adjacent to an end of the tip part, opposite the seating region.

7. The fuel injector according to claim 1, wherein the inner and outer valve needles lie along a common injector axis, and wherein the needle guide part comprises one or more fuel supply passages that extend parallel to the injector axis.

8. The fuel injector according to claim 1, wherein the biasing means are configured to bias the outer valve needle into engagement with the seating region defined by the tip part, and wherein the biasing means is housed in the nozzle body assembly.

9. The fuel injector according to claim 8, wherein the biasing means comprises a spring disposed around the outer valve needle.

10. The fuel injector according to claim 9, wherein the outer valve needle includes a spring seat for the spring.

11. The fuel injector according to claim 1, further comprising sealing means to guard against leakage of fuel between the outer valve needle and the guide bore.

12. The fuel injector according to claim 11, wherein the sealing means comprises an annular seal disposed around the outer valve needle.

13. The fuel injector according to claim 11, wherein the sealing means is disposed at or adjacent to an end of the guide bore.

14. The fuel injector according to claim 11, wherein the biasing means retains the sealing means.

15. The fuel injector according to claim 14, wherein the biasing means biases the sealing means against a surface of the needle guide part.

16. The fuel injector according to claim 1, wherein the outer valve needle is arranged to control the injection of a first fuel from the fuel injector, and wherein the inner valve needle is arranged to control the injection of a second fuel from the fuel injector.

17. The fuel injector according to claim 1, comprising a first control chamber associated with the outer valve needle, and a second control chamber associated with the inner valve needle, and wherein movement of the outer and inner valve needles is controllable by varying the fuel pressure in the first and second control chambers respectively.

18. The fuel injector according to claim 11, wherein the sealing means is disposed at or adjacent to an end of the guide bore.

19. The fuel injector according to claim 12, wherein the biasing means retains the sealing means.

20. The fuel injector according to claim 13, wherein the biasing means retains the sealing means.

21. A fuel injector for an internal combustion engine, comprising:
a generally tubular outer valve needle;
an inner valve needle slidably received in the outer valve needle; and
a nozzle body assembly comprising a tip part and a needle guide part;
wherein the tip part defines a seating region for the outer valve needle; and
wherein the needle guide part comprises a guide bore for slidably receiving the outer valve needle and a lower bore region adjacent the tip part, said lower bore region of the needle guide part having a larger bore diameter than said guide bore and defining a cavity formed around the outer valve needle for receiving a biasing spring.

* * * * *